United States Patent [19]
Jeong

[11] Patent Number: 5,724,325
[45] Date of Patent: Mar. 3, 1998

[54] METHOD FOR REDUCING LEAD IN TIME IN AN OPTICAL DISK RECORDING OR REPRODUCING APPARATUS CAPABLE OF PROCESSING DATA FOR MULTIPLE TYPES OF DISKS

[75] Inventor: Jeong-Joo Jeong, Suwon, Rep. of Korea

[73] Assignee: Samsung Electronics Co., Ltd., Kyungki-Do, Rep. of Korea

[21] Appl. No.: 675,296

[22] Filed: Jul. 1, 1996

[30] Foreign Application Priority Data

Aug. 7, 1995 [KR] Rep. of Korea ............... 24308/1995

[51] Int. Cl.⁶ .................................................. G11B 7/095
[52] U.S. Cl. ........................ 369/44.27; 369/54; 369/58
[58] Field of Search ........................... 369/44.26, 44.27, 369/44.28, 44.29, 54, 58

[56] References Cited

U.S. PATENT DOCUMENTS 5,416,758  5/1995  Ito .................................... 369/44.28

Primary Examiner—W. R. Young
Attorney, Agent, or Firm—Sughrue, Mion, Zinn, Macpeak & Seas, PLLC

[57] ABSTRACT

A method for rapidly implementing the data processing for an optical disk in an optical disk recording or reproducing apparatus capable of reproducing data from multiple types of disks. The method includes the steps of turning on a laser of a pickup device, setting the pickup device at an initial position, and driving a timer; obtaining a minimum tracking error point from an optical disk while vertically moving the pickup device from the initial position to the optical disk at a constant velocity; detecting a thickness of the optical disk from a value of the timer at the time when the minimum tracking error point is obtained and from the constant velocity during the vertical movement of the pickup device; obtaining minimum tracking error points between tracks on the optical disk while horizontally moving the pickup device at a constant velocity, at the time when the minimum tracking error point is obtained; detecting a pitch size between the tracks from a period between the minimum tracking error points and from the constant velocity during the horizontal movement of the pickup device; and discriminating the type of disk from the detected thickness of the optical disk and the detected pitch size between the tracks.

5 Claims, 2 Drawing Sheets

1

METHOD FOR REDUCING LEAD IN TIME IN AN OPTICAL DISK RECORDING OR REPRODUCING APPARATUS CAPABLE OF PROCESSING DATA FOR MULTIPLE TYPES OF DISKS

BACKGROUND OF THE INVENTION

1. Field of the Invention

The present invention relates to an optical recording or reproducing apparatus, and more particularly to a method for reducing a lead in time within an optical disk recording or reproducing apparatus capable of processing data for multiple types of disks.

The present application for a method for reducing a lead in time within an optical disk recording or reproducing apparatus, is based on Korean Application No. 24308/1995 which is incorporated by reference for all purposes.

2. Description of the Related Art

Most optical disk recording or reproducing apparatus use a compact disc (CD). Examples, of these discs include CD-I, CD-G and CD-ROM (Read Only Memory). The compact discs have the same physical structure but differ from each other in their logic structures. A servo system of the optical disk recording or reproducing apparatus operates, during an initial servo control, in accordance with position control conditions (for example, tracking gain and focusing gain), which correspond to the physical structure of the disk.

The optical disk reproducing apparatus reads data from an optical disk through a pickup device to determine the type of disk and whether the data of the optical disk can be reproduced by the apparatus. The data read out from the optical disk includes table of contents (TOC) information (in case of the CD-ROM or CD-I, volume information). The TOC provides information on the logic structure of the corresponding disk. When the logic structure and reproduction capability of the disk have been determined, the disk is in a reproduction ready state. The time taken from the insertion of disk to the reproduction ready state is called a lead in time. Typically, the lead in time is approximately 10 seconds.

As the recording or reproducing technologies of the optical disk are developed, and new applications for the disks develop, disks having formats different from the compact discs described above have been presented. These disks are catalogued according to disk density, disk thickness, and other physical characteristics of the disk.

Type discrimination for the various disk formats cannot be implemented based only on the logic structure of the disks. When logic-based determination is implemented, the lead in time is prolonged up to two or three times the typical lead in time.

In view of the multiple of types of disks available, optical disk recording or reproducing apparatus which are capable of processing data for multiple disk formats have also emerged. Generally, these apparatus are designed to reproduce data from two or more disk types. In these apparatus, it is important to discriminate the disk type in a speedy manner.

SUMMARY OF THE INVENTION

Accordingly, it is an object of the present invention to provide a method for rapidly implementing data processing for an optical disk in an optical disk recording or reproducing apparatus capable of processing data from multiple types of disks.

It is another object of the present invention to provide a method for reducing a lead in time in an optical disk recording or reproducing apparatus capable of processing data for multiple types of disks.

The method of reducing lead time will be described specifically with regard to the process of reproducing data from the disk. According to an object of the present invention, there is provided a method for discriminating the type of optical disk loaded in an optical disk recording or reproducing apparatus capable of reproducing data from multiple types of disks comprising the steps of turning on a laser of a pickup device, setting the pickup device at an initial position, and driving a timer; obtaining a minimum tracking error point with an optical disk while vertically moving the pickup device from the initial position toward the optical disk at a constant velocity; detecting a thickness of the optical disk from a value of the timer at the time when the minimum tracking error point is obtained and from the constant velocity of the pickup device during the vertical movement of the pickup device; obtaining minimum tracking error points between tracks on the optical disk while horizontally moving the pickup device at a constant velocity, at the time when the minimum tracking error point is obtained; detecting a pitch size between the tracks from a time period between the minimum detection of tracking error points and from the constant velocity during the horizontal movement of the pickup device; and discriminating the type of disk from the detected thickness of the optical disk and the detected pitch size between the tracks.

BRIEF DESCRIPTION OF THE DRAWINGS

The objects and advantages of the present invention will be readily apparent from the following detailed description of a preferred embodiment when considered in conjunction with the accompanying drawings, in which like reference symbols indicate the same or similar elements components, wherein.

DETAILED DESCRIPTION OF THE PREFERRED EMBODIMENTS

The classification of the disk type is made with the following values for physical characteristics of the disk. First, a compact disc (commonly referred to as CD) has a track density of 1.6 µm, a minimum pit size of 1 µm, and reflective and protective layers of 1.2 mm. Second, a high definition—1 (commonly referred to as HD-1) has higher track and pit densities than the previously described optical disks, i.e., reduction of intervals between pitches of tracks, and a thickness of 1.2 mm. Third, a high definition—2 (commonly referred to as HD-2) has higher track and pit densities than previously existing optical disks, i.e., reduction of intervals between pitches of tracks in approximately the same manner as the HD-1, and a thickness of 0.6 mm.

The optical disk recording or reproducing apparatus capable of reproducing data from multiple disk formats is commonly provided to use the CD and HD-1, or the CD and HD-2. The combination of HD-1 and HD-2 is also possible but has not yet been commonly used.

Figure 1:
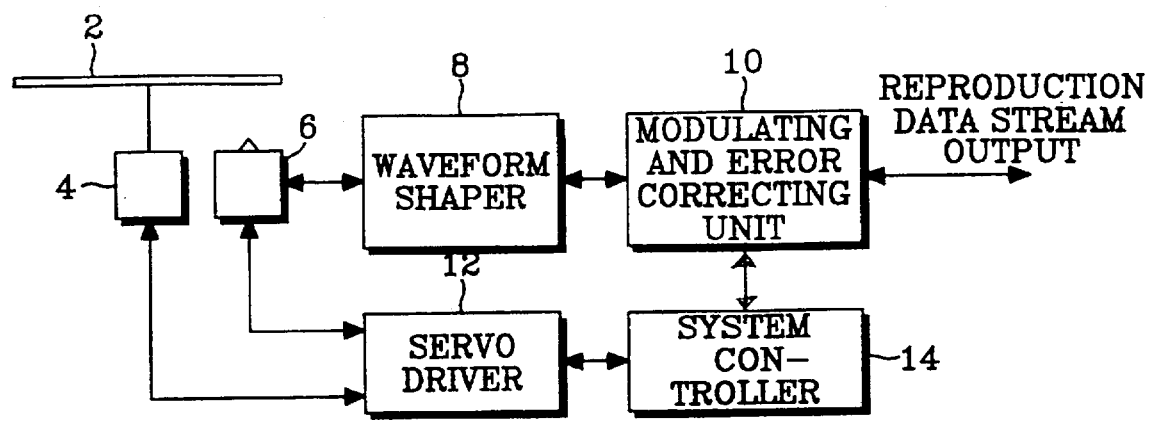
FIG. 1 is a block diagram illustrating a preferred embodiment of an optical disk recording or reproducing apparatus according to the present invention, the apparatus being capable of reproducing data from multiple types of disks.

Referring to FIG. 1, reference numeral 2 designates an optical disk, and 4 designates a spindle motor for driving rotation of the optical disk 2. Reference numeral 6 is an optical pickup device, and 8 indicates a waveform shaper which converts a radio frequency signal read out from the optical disk by means of the optical pickup device into a digital signal, performs a synchronous clock detection and a noise removal for the digital signal, and transmits a digital stream to a modulating and error correcting device 10. The modulating and error correcting device 10 performs modulation and error correction for the digital stream output from the waveform shaper 8 according to a method encoded during recording of the disk and extracts a data synchronous pattern for a phase locked loop (PLL). A servo driver 12 executes overall control operation related to servo control, such as, rotation control of the optical disk 2, focusing and tracking control, control of the spindle motor, and so on. A system controller 14 controls the servo driver 12 to perform the focusing and tracking control, reads the data output from the servo driver 12, controls the modulating and error correcting device 10, and processes data read out from the modulating and error correcting device 10 and the servo driver 12 to transmit the data to a host (not shown).

In order to implement rapidly reproduction of data in the above apparatus of FIG. 1, the lead in time should be reduced. The successful reduction of the lead in time depends upon how fast the disk type is discriminated.

A disk discrimination method according to the present invention will be discussed hereinafter. Before rotating optical disk 2 by means of the spindle motor 2, a focusing operation by the servo driver 12 is performed to detect the thickness of the optical disk 2. Next, with the pick up focused, the pickup device 6 moves to detect an interval difference between tracks. The thickness and track information provides for discrimination of the type of multidisk.

Figure 2:
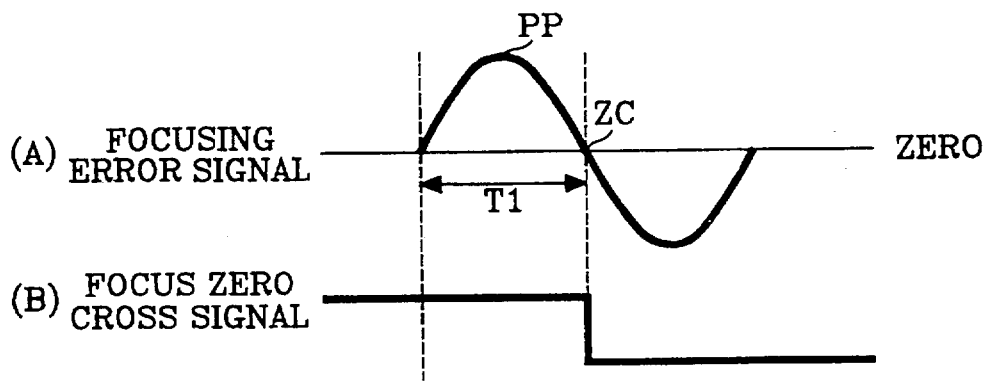
FIG. 2 (including subparts (A) and (B)) is a waveform diagram generated at the time of detecting a thickness of a disk.

Referring to FIG. 2, the waveform diagram represents the time period for detecting a thickness of the optical disk 2, a thickness detecting procedure of the optical disk 2 will be explained in detail. The thickness of the optical disk 2 is detected by measuring a focusing time period. Specifically, the focusing period corresponds to the time period for the amount of reflecting light, emitted when the laser of pickup device has been focused on the surface of the optical disk 2, to reach a maximum value. The focusing operation is executed While the servo driver 12 moves the pickup device 6 at a constant velocity towards a disk direction. A focusing error signal generated during the focusing operation forms a sinusoidal curve, as shown in (A) of FIG. 2. The curve represents the difference between the incident light and reflected light. Here, a point PP indicates the greatest difference therebetween, and a zero cross point ZC indicates the least difference therebetween. The zero cross point ZC represents a focus that is well formed on the surface of the optical disk 2, and a time period T1 required to reach the point ZC varies according to the thickness of the optical disk 2. A focus zero cross signal, as shown in (B) of FIG. 2, corresponds to zero cross point ZC.

Figure 3:
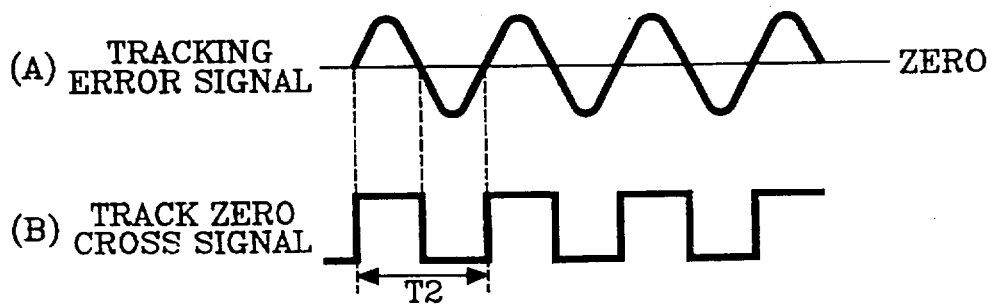
FIG. 3 (including subparts (A) and (B)) is a waveform diagram generated at the time of detecting an interval between tracks on a disk.

Next, referring to FIG. 3, the interval detection between tracks on the optical disk 2 will be discussed hereinafter. In the state where the focusing operation is performed, when the servo driver 12 moves (tracks) the pickup device 6 at a constant velocity toward an outward (or inward) circumference direction, a tracking error signal is detected as shown in (A) of FIG. 3. The tracking error signal has a maximum value on a track where no pitch exists and a minimum value on a track where a pitch exists. The tracking error signal is picked up by the pickup device 6, shaped to a digital waveform within the servo driver 12, and becomes a track zero cross signal, as shown in (B) of FIG. 3, when applied to the system controller 14. As a result, the system controller 14 measures a time period T2 of the track zero cross signal and whereby recognizes the interval between the tracks.

Figure 4:
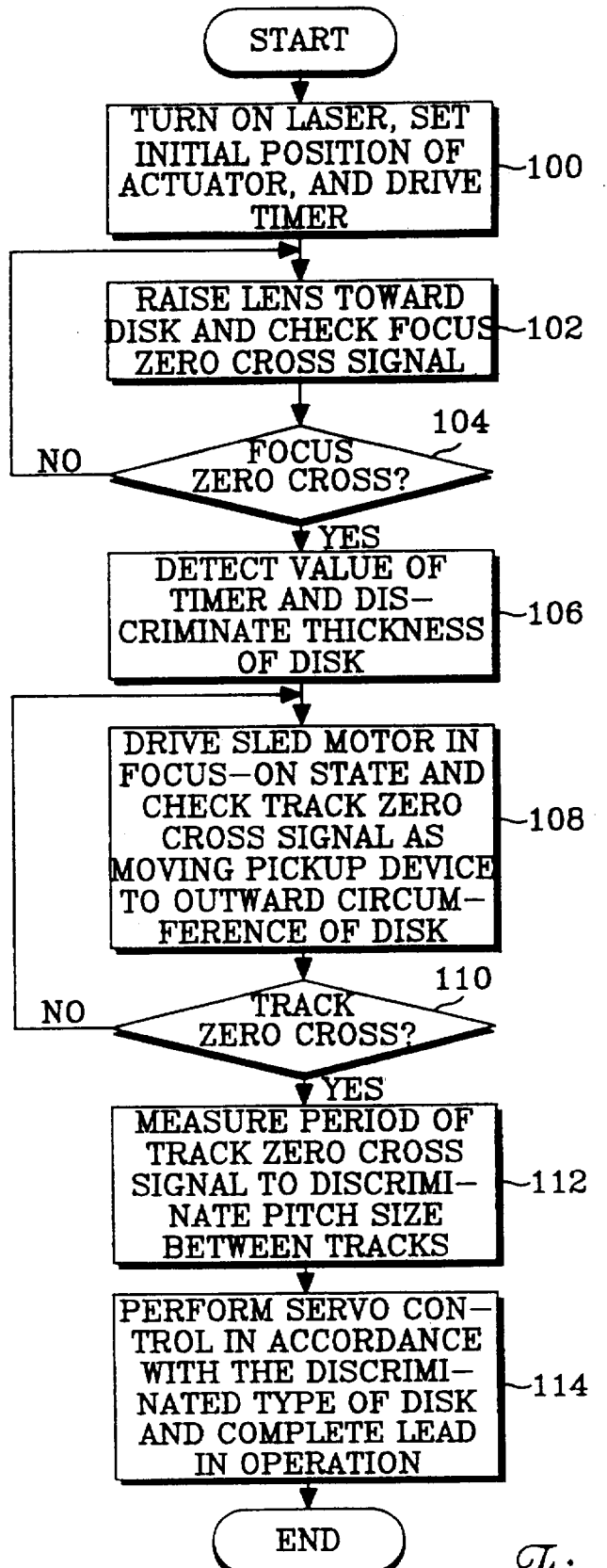
FIG. 4 is a flow chart illustrating the type discriminating process of disks according to the present invention.

Referring to FIG. 4, the flowchart shows the type discriminating process of disks according to the present invention. The system controller 14 controls the servo driver 12 in step 100 to turn on the laser of pickup device 6, sets an initial position of the actuator, and starts the timer. Then, in step 102, the system controller 14 raises the lens of the pickup device 6 towards the optical disk 2 by means of the servo driver 12, and checks for the focus zero cross signal through the servo driver 12. The system controller in step 104 detects the focus zero cross (which means the focus zero cross signal is transmitted). If the cross is detected in the step 104, the system controller 14 proceeds to step 106, where the timer value is detected and disks having a thickness of 1.2 mm or 0.6 mm are discriminated. The thickness of disk is calculated from the constant velocity when the pickup device is raised vertically and the measured value of the timer.

In step 108, the system controller 14 drives a sled motor of the servo driver 12, with the pick up focused, to move the pickup device 6 to the outward circumference of the optical disk 2 and checks the track zero cross signal through the servo driver 12. The sled motor, which horizontally moves the pickup device 6, should maintain a constant velocity during the driving of the pickup device 6 to the outward circumference of the optical disk 2.

The system controller 14 in step 110 detects the track zero cross (which means when the tracks zero cross signal is transmitted). If the cross is detected in the step 110, the system controller 14 proceeds to Step 112, where the period of the track zero cross signal is measured, and intervals of 1.6 μm, 0.8 μm, or 0.7 μm are each discriminated. It is desirable that the period measurement of the track zero cross signal should be executed for a predetermined number of times to achieve precision in measurement.

Then, the system controller 14 proceeds to step 114 to discriminate the disk type from the values obtained from the steps 106 and 112 and performs a servo control in accordance with the discriminated disk type to complete the lead in operation of the disk. In the step 114, the standard for discriminating the type of disk may be defined by the following Table.

| Thickness of Optical Disk | Pitch Size Between Tracks | Type of Disk |
| --- | --- | --- |
| 1.2 mm | 1.6 μm | CD |
| 1.2 mm | 0.7 μm | HD-1 |
| 0.6 mm | 0.8 μm | HD-2 |

As set forth above, the present invention has the following advantages: 1) the disk type can be discriminated within a rapid time period (preferably 1 second in the present invention) since the focusing operation is performed before the driving of the disk to detect the thickness of the disk, and the pickup device moves horizontally in the focused state to detect the interval between tracks; and 2) the lead in time can be reduced accordingly to reproduce the data from disk in a speedy manner.

While preferred embodiments of the present invention have been illustrated and described above, it will be understood by those skilled in the art that various changes and modifications may be made, and equivalents may be substituted for elements thereof without departing from the scope of the present invention. For example, while the above description refers specifically to the data reproducing process, the method of reducing lead time is also applicable to the process of recording data on a CD apparatus capable of recording data on multiple types of disks. In addition, many other modifications may be made to adapt a particular situation to the teaching of the present invention without departing from the scope thereof. Therefore, the present invention is not limited to the particular embodiments disclosed as the best mode contemplated for carrying out the present invention, but the present invention includes all embodiments falling within the scope of the appended claims.

What is claimed is:

1. A method for discriminating a disk type of a disk loaded in an optical disk recording or reproducing apparatus capable of reproducing data from the multiple types of disks, said method comprising the steps of:

turning on a laser of a pickup device, setting said pickup device at an initial position, and starting a timer;

obtaining a minimum tracking error point for the optical disk while vertically moving said pickup device from said initial position towards said optical disk at a constant velocity;

detecting a thickness of said optical disk from a value measured by said timer at the time when the minimum tracking error point is obtained and from the constant velocity during the vertical movement of said pickup device;

obtaining minimum tracking error points between tracks on said optical disk while horizontally moving said pickup device at a constant velocity, at the time when the minimum tracking error point is obtained;

detecting a pitch size between tracks from a time period between the detection of tracking error minimum points and from the constant velocity during the horizontal movement of said pickup device; and discriminating the disk type from the detected thickness of said optical disk and the detected pitch size between the tracks.

2. The method as claimed in claim 1, wherein said type of said multidisk is discriminated according to the following Table:

TABLE

| Thickness of Optical Disk | Pitch Size Between Tracks | Type of Disk |
| --- | --- | --- |
| 1.2 mm | 1.6 µm | CD |
| 1.2 mm | 0.7 µm | HD-1 |
| 0.6 mm | 0.8 µm | HD-2 |

3. A method for reducing a lead in time in an optical disk recording or reproducing apparatus capable of reproducing data from multiple types of disks said method comprising the steps of:

turning on a laser of a pickup device, setting said pickup device at an initial position, and starting a timer;

obtaining a minimum tracking error point for the optical disk while vertically moving said pickup device from said initial position towards said optical disk at a constant velocity;

detecting a thickness of said optical disk from a value measured by said timer at the time when the minimum tracking error point is obtained and from the constant velocity during the vertical movement of said pickup device;

obtaining minimum tracking error points between tracks on said optical disk while horizontally moving said pickup device at a constant velocity, at the time when the minimum tracking error point is obtained;

detecting a pitch size between tracks from a time period between the detection of tracking error minimum points and from the constant velocity during the horizontal movement of said pickup device;

discriminating the disk type from the detected thickness of said optical disk and the detected pitch size between the tracks; and performing a servo control in accordance with the discriminated disk type to complete the lead in operation.

4. The method as claimed in claim 3, wherein said time period between the detected minimum tracking error points is measured for a predetermined number of times.

5. The method as claimed in claim 4, wherein said lead in time is approximately 1 second.

* * * * *